United States Patent Office 2,725,382
Patented Nov. 29, 1955

2,725,382

THIAZOLYLMERCAPTOSUCCINATES

Marion W. Harman, Nitro, W. Va., assignor to Monsanto Chemical Company, St. Louis, Mo., a corporation of Delaware No Drawing. Application November 25, 1952, Serial No. 322,587

10 Claims. (Cl. 260—306)

This invention relates to thiazolylmercaptosuccinates and to methods for their preparation. These are polyfunctional compounds having properties which render them useful for many purposes.

The thiazolylmercaptosuccinates may be prepared by heating a mercaptothiazole and a diester of maleic acid. For the condensation of the mercaptothiazole and maleic ester neither solvent nor catalyst is necessary. While condensation of the maleate with the mercaptothiazole takes place in an anhydrous medium in the presence of an alkaline catalyst, no advantage of having the catalyst present has been noted.

The structure of the new class of compounds is represented by the formula

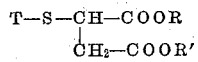

where T represents a thiazolyl radical and R and R' represent the same or different alicyclic, alkyl, aralkyl or aryl groups. Suitable examples of thiazolyl radicals are benzothiazolyl, 4,5-dimethyl thiazolyl, 4-methyl thiazolyl, naphtho thiazolyl, 5-chlorobenzothiazolyl, 4-methyl benzothiazolyl, 4-ethyl benzothiazolyl, 4,5-diethyl benzothiazolyl, phenyl benzothiazolyl, 4-propyl thiazolyl, 4-butyl thiazolyl, 5-carbomethoxy 4-methyl 2-thiazolyl, 5-carbethoxy 4 - methyl 2 - thiazolyl, 5 - carbobutoxy 4-methyl 2-thiazolyl and 4-methyl 5-acetyl thiazolyl. Suitable examples of alkyl groups are methyl, ethyl, n-propyl, isopropyl, isobutyl, n-butyl, tert-butyl, amyl, hexyl, octyl, decyl, lauryl, oleyl, allyl, octadecyl and pentadecyl. Suitable aralkyl groups are benzyl and phenethyl. Other suitable examples of R and R' are phenyl, tetrahydrofurfuryl and cyclohexyl groups.

In some instances the evidence indicates that higher polymers are formed of the type

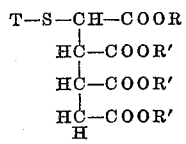

where T, R and R' have the same significance as before. However, in no instance has the formation of compounds containing more than two molecules of the maleate been observed.

The thiazolylmercaptosuccinates are heavy oils which cannot be distilled without some decomposition. They are valuable adjuvants for the compounding of mineral oil lubricants. They increase the load carrying capacity of mineral oil lubricants and reduce wear. Furthermore the new compounds are valuable plasticizers and softeners for rubbers and resins such as polyvinyl chloride, natural rubber and synthetic butadiene polymers. Additionally, the compounds possess fungicide and antiseptic properties. They may be applied to foliage of plants and to textiles, leather and other materials subject to degradation by microorganisms.

The following examples illustrate the preparation of the new compounds in detail but are not to be taken as limitative of the invention.

EXAMPLE 1

86 parts by weight (0.5 molecular proportion) of 97% mercaptobenzothiazole was mixed with 172.1 parts by weight (1 molecular proportion) of diethyl maleate. The mixture was heated and stirred at 150° C. for 24 hours and then cooled whereupon the mixture was diluted with heptane and the heptane solution washed with 10% sodium carbonate solution. About 30 parts by weight of unreacted mercaptobenzothiazole was recovered on acidification of the washings. The heptane solution was then washed with water until the washings were neutral and the solvent and unreacted diethyl maleate removed by distillation. Diethyl maleate distills at 83–84° C./4 mm. pressure. The reaction mixture was heated under reduced pressure to a maximum pot temperature of 150° C. whereupon about 75 parts by weight of diethyl maleate was recovered. The residue comprising the desired diethyl α-(2-benzothiazolylmercapto)-succinate was a dark amber oil. 128 parts by weight or 75.5% yield was obtained. Analysis gave 4.0% nitrogen and 18.0% sulfur. The calculated values for $C_{15}H_{17}NO_4S_2$ are 4.1% nitrogen and 18.9% sulfur.

EXAMPLE 2

86 parts by weight (0.5 molecular proportion) of 97% mercaptobenzothiazole was mixed with 228 parts by weight (1 molecular proportion) of dibutyl maleate. The mixture was heated for 24 hours at 140–150° C. or until no crystals of mercaptobenzothiazole separated on cooling. The reaction mixture was then cooled and dissolved in heptane and the heptane solution filtered whereupon about 16 parts by weight of mercaptobenzothiazole were recovered. The clear heptane solution was then washed with 10% sodium carbonate and finally with water until the washings were neutral. The solvent and any unreacted dibutyl maleate were removed by distillation under reduced pressure. 105.5 parts by weight of dibutyl maleate were recovered. The product distilled at 150–185° C./2 mm. pressure at a pot temperature of 220° C. but there was some decomposition. The product was a dark red liquid. Analysis indicated that two moles of mercaptobenzothiazole combined with three moles of dibutyl maleate.

EXAMPLE 3

86 parts by weight (0.5 molecular proportion) of 97% mercaptobenzothiazole was mixed with 114 parts by weight (0.5 molecular proportion) of dibutyl maleate and the mixture so prepared heated and stirred for 24 hours at 165–175° C. The reaction mixture was then cooled and dissolved in heptane and the heptane solution extracted with 10% sodium carbonate. Approximately 6.2 parts by weight of mercaptobenzothiazole were recovered on acidification of the washings. The heptane solution was washed with water until the washings were neutral and the solvent removed by distillation. Distillation to 135° C./2 mm. served to remove the solvent and dibutyl maleate. The residue from this treatment was a red oil containing 10.76% sulfur. Sulfur required for $C_{31}H_{45}NO_8S_2$ is 10.27%. Thus, one molecular proportion of mercaptobenzothiazole is combined with two molecular proportions of dibutyl maleate.

The peptizing properties of the new compounds were illustrated by tests carried out in various rubber compositions. In one test the softener was added to smoked sheets during mastication in a Banbury and the plasticity of the treated stock determined on a Mooney plastometer and also on a Firestone extrusion plastometer. Similar tests were carried out employing a gum stock comprising

| | Parts by weight |
|---|---|
| Smoked sheets | 100 |
| Zinc oxide | 5 |
| Sulfur | 3 |
| Stearic acid | 1 |
| Mercaptobenzothiazole | 1 |

The peptizer was added to the base stock during milling. Finally, the softening of a tread stock was demonstrated by addition to a composition comprising

| | Parts by weight |
|---|---|
| Smoked sheets | 100 |
| Carbon black | 50 |
| Zinc oxide | 5 |
| Sulfur | 3 |
| Stearic acid | 3 |
| Pine tar | 2 |
| Mercaptobenzothiazole | 0.75 |

The results are summarized below as compared to the untreated compositions. The data with the Firestone plastometer was obtained by extruding at 10 lbs./in.$^2$ in the case of the smoked sheets alone and the tread stock and at 4 lbs./in.$^2$ in the case of the gum stock.

*Table I*

| Material Added to the Base Stock | Smoked Sheets only | | Gum Stock | | Tread Stock | |
|---|---|---|---|---|---|---|
| | Mooney | Extrusion | Mooney | Extrusion | Mooney | Extrusion |
| 0.3 part of product of Example 3 | 53 | sec. 15 | 40 | sec. 195 | 55 | sec. 17 |
| None | 64 | 25 | 45 | 260 | 59 | 25 |

It is intended to cover all changes and modifications of the examples of the invention herein chosen for purposes of disclosure which do not constitute departures from the spirit and scope of the invention.

What is claimed is:

1. A dialkyl thiazolylmercaptosuccinate wherein each alkyl group contains less than 19 carbon atoms.
2. A dialkyl benzothiazolylmercaptosuccinate wherein each alkyl group contains less than 19 carbon atoms.
3. Diethyl-α-(2-benzothiazolylmercapto)succinate.
4. Dibutyl-α-(2-benzothiazolylmercapto)succinate.
5. The process of preparing thiazolylmercaptosuccinates which comprises heating at about 140–175° C. a 2-mercaptothiazole and a dialkyl maleate wherein each alkyl group contains less than 19 carbon atoms.
6. The process of preparing thiazolylmercaptosuccinates which comprises heating at about 140–175° C. 2-mercaptobenzothiazole and a dialkyl maleate wherein each alkyl group contains less than 19 carbon atoms.
7. The process of preparing thiazolylmercaptosuccinates which comprises heating at about 150° C. 2-mercaptobenzothiazole and diethyl maleate.
8. The process of preparing thiazolylmercaptosuccinates which comprises heating at about 140–150° C. 2-mercaptobenzothiazole and dibutyl maleate.
9. The process of preparing thiazolylmercaptosuccinates which comprises heating at about 165–175° C. 2-mercaptobenzothiazole and dibutyl maleate.
10. A compound possessing the structural formula of

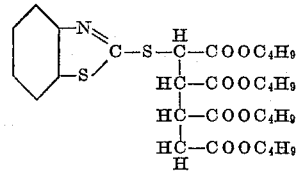

References Cited in the file of this patent

UNITED STATES PATENTS 2,559,521    Smith et al.    July 3, 1951

FOREIGN PATENTS 845,793    France    Sept. 1, 1939

OTHER REFERENCES

Purdie: J. Chem. Soc. (London), vol. 47, p. 867 (1885).

Purdie et al.: J. Chem. Soc. (London), vol. 59, p. 469 (1891).